United States Patent [19]

Kitano et al.

[11] Patent Number: 4,720,002
[45] Date of Patent: Jan. 19, 1988

[54] CLUTCH HAVING AN ADJUSTABLE DIAPHRAGM SPRING ENGAGING LEVER

[75] Inventors: Seiichi Kitano, Shijounawate; Yasunobu Fukatani, Hirakata; Masaaki Asada, Ibaragi; Kazuhiko Yoneda, Katano, all of Japan

[73] Assignee: Kabushiki Kaisha Daikin Seisakusho, Osaka, Japan

[21] Appl. No.: 900,655

[22] Filed: Aug. 26, 1986

[30] Foreign Application Priority Data

Sep. 2, 1985 [JP] Japan .................. 60-194158

[51] Int. Cl.$^4$ .................. F16D 13/48; F16D 13/75
[52] U.S. Cl. .................. 192/70.25; 192/70.29; 192/70.3; 192/89 B; 192/111 B
[58] Field of Search .......... 192/111 B, 110 R, 109 R, 192/89 QT, 89 B, 70.3, 70.19, 70.23, 70.25, 70.26, 70.27, 70.29, 70.28

[56] References Cited

U.S. PATENT DOCUMENTS

| 3,018,863 | 1/1962 | Elfes | 192/70.3 X |
| 3,160,253 | 12/1964 | Maurice | 192/109 R X |
| 3,754,628 | 8/1973 | Hildebrand | 192/111 B |
| 3,791,499 | 2/1974 | Ryan | 192/89 B X |
| 4,333,554 | 6/1982 | Sink et al. | 192/70.27 X |

Primary Examiner—Rodney H. Bonck
Attorney, Agent, or Firm—Armstrong, Nikaido, Marmelstein & Kubovcik

[57] ABSTRACT

A clutch having an adjustable diaphragm spring engaging lever and a release bearing for disengaging the clutch. The clutch disc is spline fitted onto an input shaft of transmission. A sleeve, having the release bearing fastened at its transmission end, is fitted on the outer periphery of the input shaft. A load transmitting retainer is fitted on the clutch end of the sleeve. A clutch cover, covering the clutch and flywheel is mounted on the flywheel. A diaphragm spring is disposed between the clutch cover and the retainer. A clutch lever is fulcrummed at its inner end to a groove in the retainer ring and at its outer end to an adjustable member on the clutch cover for engaging and disengaging the clutch disc with the pressure plate and flywheel.

5 Claims, 5 Drawing Figures

FRONT ← REAR →

CLUTCH HAVING AN ADJUSTABLE DIAPHRAGM SPRING ENGAGING LEVER

BACKGROUND OF THE INVENTION

Industrial useful field

This invention relates to a so-called pull-type clutch which carries out a releasing operation so as to pull a release bearing toward a transmission side by means of a releasing lever connected to a clutch pedal.

Prior art and its problem

In such a conventional clutch, as shown by FIG. 4, a slantly disposed coil spring 100 is used as a load generating member and a spring force is transmitted to a retainer so that a pressing force on a clutch disc 108 is actuated from the retainer 102 through a lever 104 to a pressure plate 106 (U.S. patent application No. 549009, Japanese Examined Patent Publication NO. 46-15046).

However, this conventional clutch includes a problem that the spring force of the coil spring 100 causes a pedal step-on force to increase with an increase in a stroke of clutch pedal, thus leading to an increase in a pedal step-on force at the time of releasing the clutch.

Further, it includes a problem that, at the time of high-speed rotation, a centrifugal force acting on the coil spring 100 compresses the coil spring 100 to reduce the spring force applied on the pressure plate 106.

Object of the invention

An object of the invention is to provide a clutch, which can solve problems induced by using a coil spring as a load generating member in a so-called pull-type clutch, through means of a diaphragm spring used as the load generating member.

Composition of the invention (1) Technical measure

In a clutch carrying out a releasing operation so as to pull a release bearing apart from a flywheel by means of a releasing lever connected to a clutch pedal; a clutch disc is spline fitted onto an input shaft of a transmission side, a sleeve is provided on an outer periphery of the input shaft, a release bearing is fastened to a transmission side end of this sleeve, a load transmitting retainer is spline fitted onto a flywheel side end of the sleeve, a clutch cover connected to the flywheel and covering a pressure plate for pressing the clutch disc is provided, an approximately disc-like diaphragm spring is disposed between this clutch cover and said retainer, an outer peripheral part of the diaphragm spring is held through wire rings to the clutch cover, an inner peripheral part of the diaphragm spring is made pressingly contact with said transmission side end of the retainer, a lever of an inner peripheral side fulcrum of which is held by the retainer an outer pheripheral side fulcrum of which is pressed on the clutch cover so as to be interrelated therewith and an intermediate fulcrum of which is pressed on the pressure plate, is provided between the retainer and the pressure plate, thus a load of the diaphragm spring on the retainer being transmitted in an magnifying manner at a lever ratio of distances between fulcrums.

(2) Function

The diaphragm spring generates the pressing force on the pressure plate so that the step-on force of clutch pedal is not required to be increased at the time of releasing the clutch and little influence due to centrifugal force arises even in high-speed rotation.

DETAILED DESCRIPTION OF THE INVENTION

Figure 1:
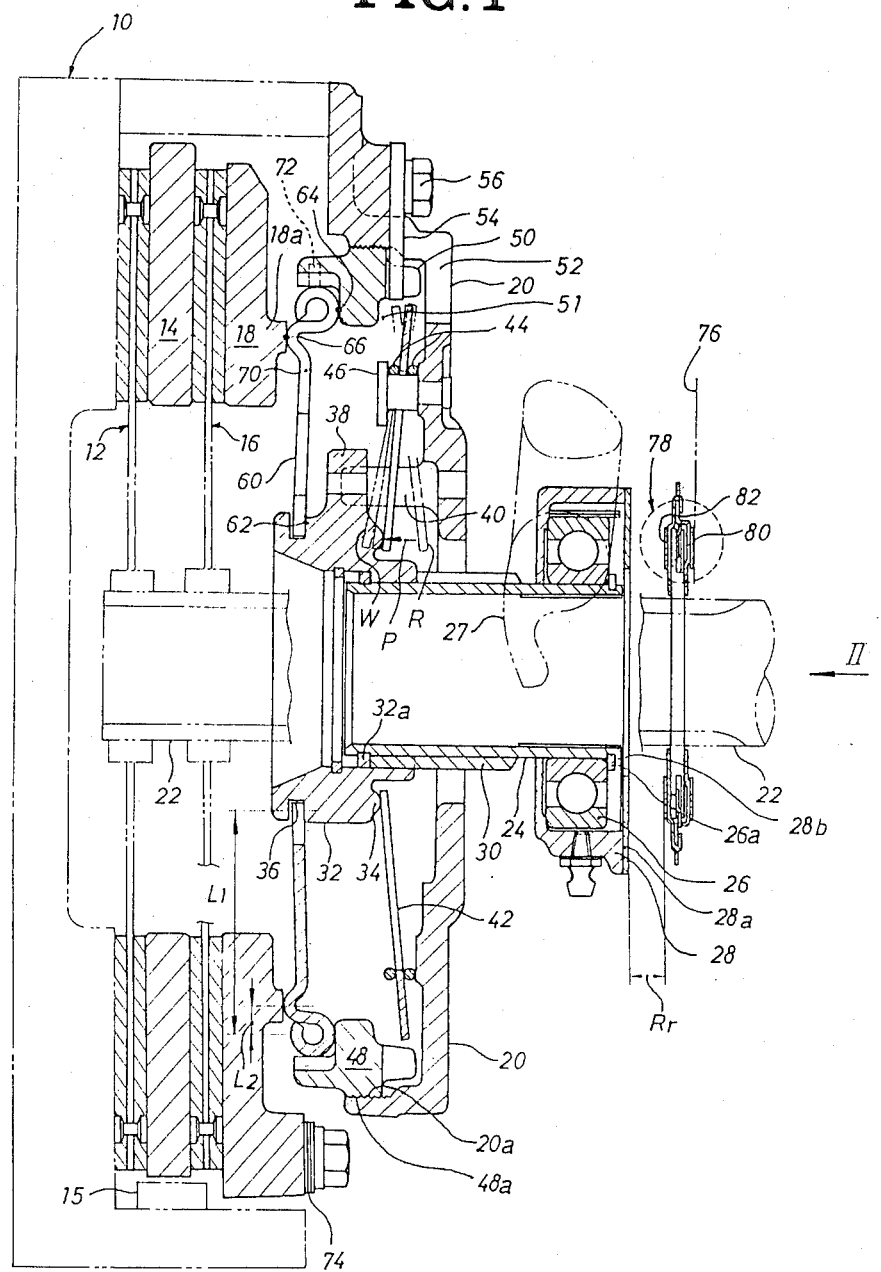
FIG. 1 is a vertical sectional view of a clutch according to the present invention.

In FIG. 1 (A-O-A sectional view of FIG. 2) showing the vertical sectional view of the clutch according to the present invention, 10 is a flywheel. A clutch disc 12, an intermediate plate 14 and a clutch disc 16 press on a back face of the flywheel 10 in turns, and a pressure plate 18 pressing them is installed. A pin 15 fixed to the flywheel 10 is provided at a radially outside of the intermediate plate 14, and this pin 15 is adapted to cause the flywheel 10 to rotate integrally with the intermediate plate 14.

A clutch cover 20 is installed so as to cover the pressure plate 18 at a rear side of the pressure plate 18, the clutch cover 20 being formed into a thick wall by forging for example. The clutch discs 12 & 16 spline fit onto an input shaft 22 of a rear-stage transmission.

A cylindrical sleeve 24 fits axially slidingly onto a radial outer periphery of the input shaft 22. A release bearing 26 is fastened by a snap ring 26a to a rear end or a transmission side end of the sleeve 24. A bearing holder 28 covering the release bearing 26 is provided at an outside of the release bearing 26, and a pressing plate 28a is fixed to a rear end face of the bearing holder 28. A through hole 28b through which said input shaft 22 passes is made on the pressing plate 28a.

Incidentally, in the figure, 27 is a releasing lever connected to a clutch pedal, and this releasing lever 27 is adapted to shift the release bearing 26 in its axial direction.

A spline external tooth 30 is formed on a portion of the sleeve 24 other than that onto which the release bearing is fitted, and a retainer 32 spline fits onto the spline external tooth 30. A snap ring 32a locks the retainer 32 to limit a forward sliding range of the retainer 32.

The retainer 32 is made for example of casting and formed into an approximately annular shape. A pressing part 34 is formed at a rear face side end of the retainer 32 over the entire periphery, and an annular groove 36 is formed at its front face side end. Projections 38 are integrally formed on a radially outer peripheral part of the retainer 32 at, for example, three places with equal distances provided therebetween in a circumferential direction.

Figure 2:
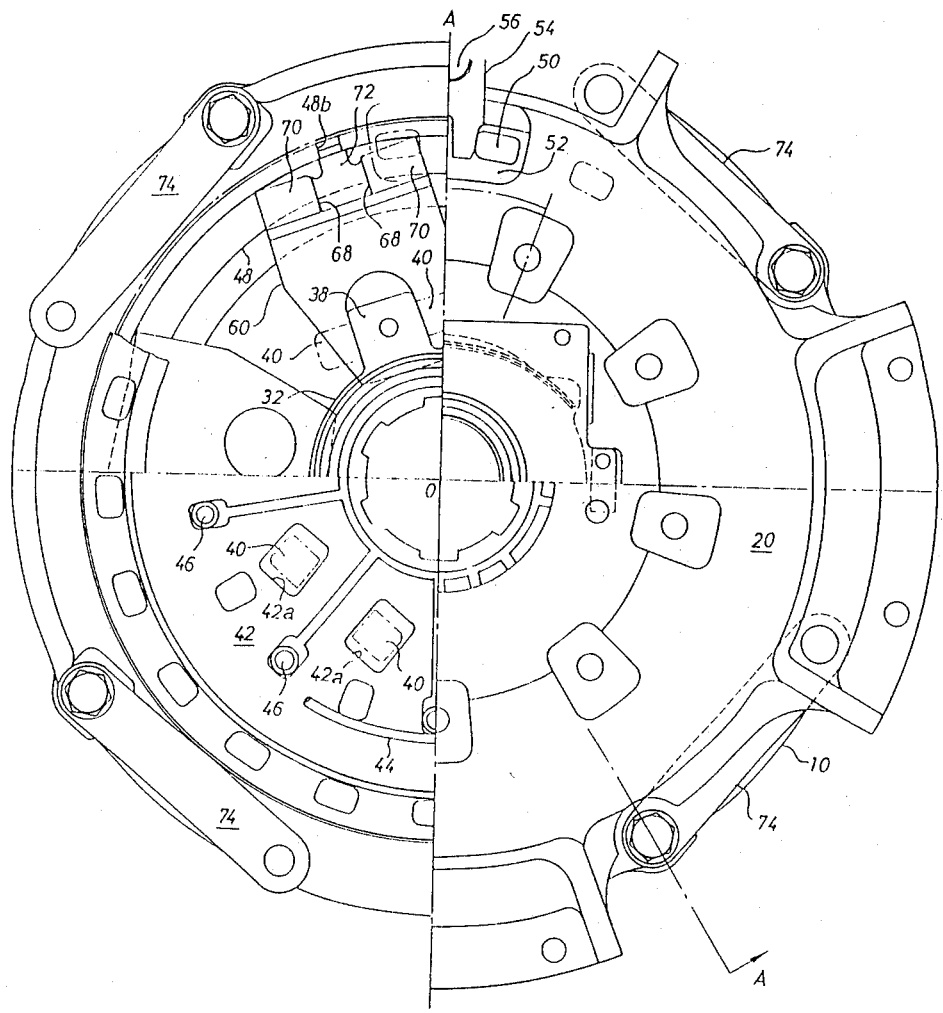
FIG. 2 is a view viewed in a direction of arrow II of FIG. 1.

Mating projections 40 are integrally formed on an inside face of the clutch cover 20 corresponding to the projections 38. Two mating projections 40 are formed as shown by FIG. 2 along both side faces of the projection 38, and the mating projection 40 couple the clutch cover 40 with the retainer 32 so as to cause them to rotate integrally each other.

As shown in FIG. 1, an approximately disc-like diaphragm spring 42 is installed between the clutch cover 20 and the projection 38. An outer peripheral part of the diaphragm spring 42 is held by a stud pin 46 to the clutch cover 20 through two wire rings 44. An inner peripheral part of the diaphragm spring 42 presses on the pressing part 34 of the retainer 32. As shown by FIG. 2, a square hole 42a passing the mating projection 40 is formed at a portion corresponding to the mating projection 40 of the diaphragm spring 42.

As shown in FIG. 1, a threaded part 20a is formed on an inner peripheral face of the clutch cover 20 at radial outside of the diaphragm spring 42, and a threaded part 48a of an approximately annular adjuster ring 48 is screwed to the threaded part 20a.

Projections 50 are formed at twenty-four places, for example, on a rear end face of the adjuster 48 with equal distances left therebetween in its circumferential direction. The projections 50 are formed at a radially outer peripheral part of the adjuster ring 48 and a space 62 is formed at an inner peripheral part of the projection 50, which permits movement of the outer peripheral part of the diaphragm spring 42 caused by the releasing operation.

Holes 52 are formed on the clutch cover corresponding to the projections 50, and a lock plate 54 is fastened by a bolt 56 to the hole 52. A bottom part in the figure of the lock plate 54 engages with the projection 50, so that the adjuster ring 48 and the clutch cover 20 are integrally coupled together through means of the lock plate 54 while permitting axial positional adjustment of the adjuster ring 48.

Levers 60 for releasing operation are disposed at six places between the pressure plate 18 and the retainer 32 with equal distances left therebetween in the circumferential direction. An inner peripheral side fulcrum 62 of the lever 60 fits in the annular groove 36, an outer peripheral side fulcrum 64 presses on a front end face of the adjuster ring 48 and an intermediate fulcrum 66 presses on a fulcrum land 18a of the pressure plate 18. Lever ratios of these inner peripheral side fulcrum 62, outer peripheral side fulcrum 64 and intermediate fulcrum 66 are set to L1:L2.

Figure 2A:
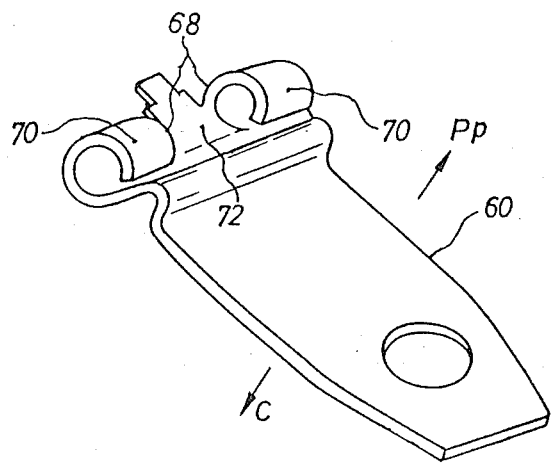
FIG. 2a is an oblique view of a lever.

The foregoing lever 60 is a component made, for example, by plate working. As shown by FIG. 2 and FIG. 2a, two cut lines 68 are formed at a radially outer peripheral part of the lever 60, said outer peripheral side fulcrum 64 and intermediate fulcrum 66 (FIG. 1) are formed by bending external pieces 70 of both sides, and a central piece 72 of central portion extending radially outwardly fits in a recessed part 48b of the adjuster ring 48. Incidentally, in FIG. 2a, an arrow $P_p$ indicates a direction of the pressure plate 18 and an arrow C indicates a direction of the clutch cover 20.

Well-known circumferentially extending strap plates 74 are disposed at four places between an outer peripheral part of the pressure plate 18 and the clutch cover 20 with equal distances left therebetween in the circumferential direction.

Further, an inertia brake 78 is interposed between the pressing plate 28a of FIG. 1 and a transmission side end face 76 while spline fitting onto the input shaft 22. The inertia brake 78 has facings 80 & 82 on its both end faces, and a releasing allowance $R_r$ is provided between the facing 82 and the pressing plate 28a.

Function will be described hereunder. In an initial setting state as shown by a solid line of FIG. 1, a spring force P of the diaphragm spring 42 presses forward the pressing part 34 of the retainer 34. This spring force P is transmitted from the inner peripheral side fulcrum 62 of the annular groove 36 to the lever 60, and further transmitted as the pressing force of the clutch discs 12 & 16 from the intermediate fulcrum 66 to the fulcrum land 18a by being magnified to about three times, for example, with the lever ratio L1:L2.

Since the diaphragm spring 42 is held in an approximately flat position under this state, the diaphragm spring 42 is scarcely affected by the centrifugal force even at a high rotation speed so that there is no possibility of decrease in the pressing force applied to the clutch discs 12 & 16.

When the clutch discs 12 & 16 have been worn out after a long term of operation, the pressure plate 18 moves forward and the retainer 32 also moves forward in the same way. In this worn-down state, the diaphragm spring 42 comes to a W-position shown by a two-dot chain line of FIG. 1. Since the outer peripheral part of the lever 60 takes up a backwardly inclining position under this state, a normal position of the lever 60 is to be recovered by screwing the adjuster ring 48 forward after removing the lock plate 54.

Figure 3:
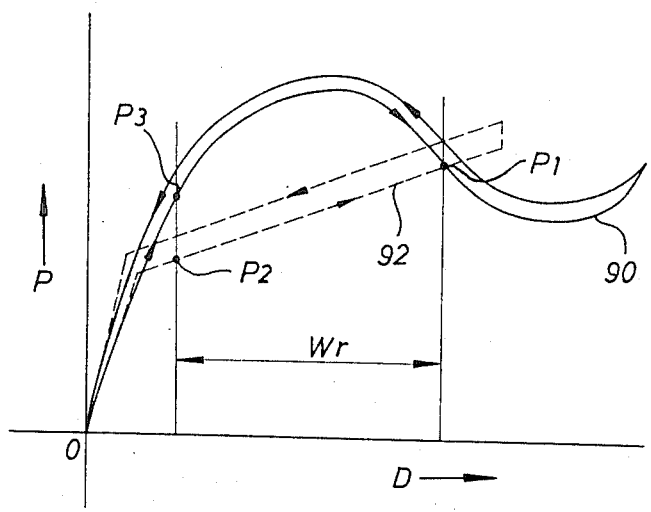
FIG. 3 is a graph showing a relation between a spring force and a distorsion of a diaphragm spring.
Figure 4:
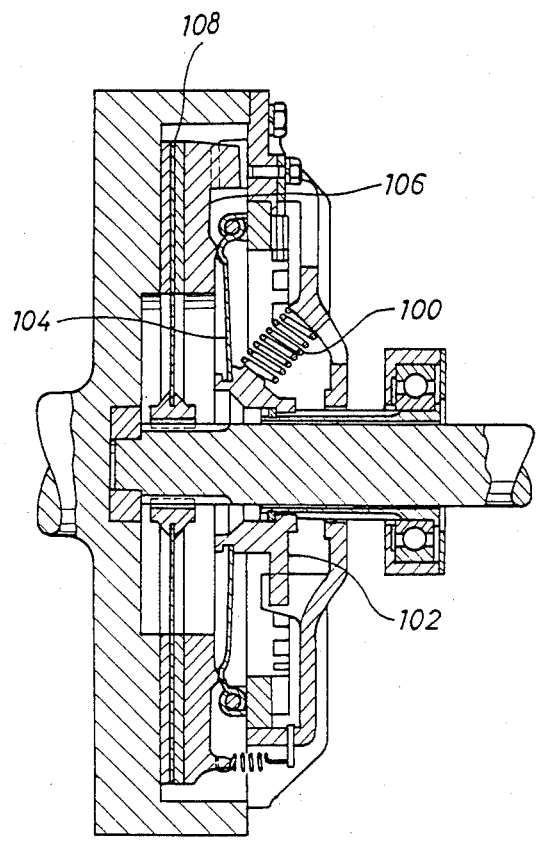
FIG. 4 is a vertical sectional view of a conventional embodiment.

Incidentally, a spring characteristic curve of the diaphragm spring 42 has an upwardly convex shape within a range of worn-down allowance $W_r$ corresponding to the wear amount of clutch discs 12 & 16 as shown by a characteristic curve 90 of FIG. 3 representing a relation between the distorsion D and the spring force P, so that the spring force P generated by the diaphragm spring 42 becomes larger than that of a characteristic curve 92 for a conventional coil spring 100 (FIG. 4) and the pressing force of the pressure plate 18 on the clutch discs 12 & 16 increases as compared with conventional one.

Further, when the clutch discs 12 & 16 are worn out, the spring force decreases from a setting load P1 to a worn-down load P2 in case of the characteristic curve 92 but it decreases from the setting load P1 only down to a worn-down load P3 in case of the characteristic curve 90, so that a so-called worn-down load at the time of the clutch discs 12 & 16 being worn out becomes large. Moreover, the above-mentioned characteristic curve 90 can afford a decrease in a releasing force required for releasing the clutch to lighten a step-on force of the clutch pedal.

Then, at the time of releasing i.e. when the clutch pedal is stepped on, the release lever 27 causes the release bearing 26 to move backward and the sleeve 24 also slides together with the release bearing 26. When the sleeve 24 slides backward, the retainer 32 held by the snap ring 32a is pulled backward against the spring force P of the diaphragm spring 42, thus the diaphragm spring 42 takes up an R-position of FIG. 1. In this instance, the inner peripheral side fulcrum 62 of the lever 60 moves backward around the outer peripheral side fulcrum 64 and the intermediate fulcrum also moves backward, so that the pressure plate 18 is moved backward by the spring force of the strap plate 74 and the pressing state of the clutch disc 12 & 16 is released.

Effect of the invention

As described above, in the clutch according to the present invention, the diaphragm spring 42 is incorporated in the narrow clutch cover 20 in place of the conventional coil spring 100, the spring force of the diaphragm spring 42 is transmitted to the retainer 32, and the lever 60 which magnifies the spring force by the lever ratio L1:L2 is interposed between the retainer 32 and the pressure plate 18; so that the diaphragm spring 42 is scarcely affected by the centrifugal force and the possibility of decrease in pressing force on the clutch discs 12 & 16 due to the centrifugal force can be eliminated.

Since the spring characteristic curve of diaphragm spring 42 has the upwardly convex shape within the range of worn-down allowance $W_r$ corresponding to the wear amount of clutch discs 12 & 16 as shown by the characteristic curve 90 of FIG. 3 representing the relation between the distorsion D and the spring force P, the spring force P generated by the diaphragm spring 42 becomes larger than that of the characteristic curve 92 for the conventional coil spring 100 (FIG. 4) and the pressing force of the pressure plate 18 on the clutch discs 12 & 16 can be increased as compared with the conventional one.

Moreover, when the clutch discs 12 & 16 are worn out, the spring force decreases from the setting load P1 to the worn-down load P2 in case of the characteristic curve 92 but it decreases from the setting load P1 only down to the worn-down load P3 in case of the characteristic curve 90, so that the so-called worn-down load at the time when the clutch discs 12 & 16 are worn out becomes large. Furthermore, the above-mentioned characteristic curve 90 can afford the decrease in the releasing force required for releasing the clutch to lighten the step-on force of the clutch pedal.

What is claimed is:

1. A clutch carrying out a releasing operation so as to pull a release bearing apart from a flywheel by means of a releasing lever connected to a clutch pedal, characterized by that a clutch disc is spline fitted onto an input shaft of a transmission, a sleeve is provided on an outer periphery of the input shaft, a release bearing is fastened to a transmission side end of this sleeve, a load transmitting retainer is spline fitted onto a flywheel side end of the sleeve, a clutch cover connected to the flywheel and covering a pressure plate for pressing the clutch disc is provided, an approximately disc-like diaphragm spring is disposed between this clutch cover and said retainer, an outer peripheral part of the diaphragm spring is held through wire rings to the clutch cover, an inner peripheral part of the diaphragm spring is in pressing contact with said transmission side end of the retainer, a lever an inner peripheral side fulcrum of which is held by the retainer an outer peripheral side fulcrum of which is pressed on the clutch cover so as to be interrelated therewith and an intermediate fulcrum of which is pressed on the pressure plate, is provided between the retainer and the pressure plate, and a load of the diaphragm spring on the retainer is transmitted in an magnifying manner at a lever ratio of distances between the fulcrums.

2. A clutch as set forth in claim 1, in which the retainer is an approximately annular forging, a pressing part on which the inner peripheral part of the diaphragm spring presses projects over an entire circumference from an end face of the retainer opposite to the flywheel side, radially outwardly extending projections are formed on an outer peripheral part of the retainer, said projections fitting in mating projections interconnected to the clutch cover.

3. A clutch as set forth in claim 1, in which the levers are disposed at plural places with equal distances left therebetween in a circumferential direction of the clutch, two cut-lines are formed on each of said levers at their outer peripheral side end, the outer peripheral side fulcrum and the intermediate fulcrum are formed by bending two outside pieces thus divided by the cutlines, a central piece formed between the outside pieces is extended outwardly in a radial direction, and this central piece fits in an adjuster ring which screws into an inner peripheral face of the clutch cover.

4. A clutch cover as set forth in claim 3, in which the adjuster ring for adjusting a wear of the clutch disc screws in an inside face of outer peripheral part of the clutch cover in such a manner that its axial position can be freely adjusted, projections are formed at plural places on an end face of the adjuster ring oppposite to the flywheel side with equal spaces left therebetween in a circumferential direction, holes are made on the clutch cover corroponding to these projections, and a lock plate fitting in between said projections is disposed in the hole so that the lock plate can lock the adjuster ring in its circumferential direction while allowing its axial positional adjustment.

5. A clutch carrying out a releasing operation so as to pull a release bearing apart from a flywheel by means of a releasing lever connected to a clutch pedal, characterized by that a clutch disc is spline fitted onto an input shaft of a transmission, a sleeve is provided on an outer periphery of the input shaft, a release bearing is fastened to a transmission side end of this sleeve, a load transmitting retainer is spline fitted onto a flywheel side end of the sleeve, a clutch cover connected to the flywheel and covering a pressure plate for pressing the clutch disc is provided, an approximately disc-like diaphragm spring is disposed between this clutch cover and said retainer, an outer peripheral part of the diaphragm spring is held through wire rings to the clutch cover, an inner peripheral part of the diaphragm spring is in pressing contact with said transmission side end of the retainer, a lever an inner peripheral side fulcrum of which is held by the retainer an outer peripheral side fulcrum of which is pressed on the clutch cover so as to be interrelated therewith and an intermediate fulcrum of which is pressed on the pressure plate, is provided between the retainer and the pressure plate, a load of the diaphragm spring on the retainer is transmitted in an magnifying manner at a lever ratio of distances between the fulcrums, said retainer being an approximately annular forging, a pressing part on which the inner peripheral part of the diaphragm spring presses projects over an entire circumference from an end face of the retainer opposite to the flywheel side, radially outwardly extending projections are formed at equally spaced positions on an outer peripheral part of the retainer in the circumferential direction, said outwardly extending projection fitting in mating projections interconnected to the clutch cover, said levers being disposed at spaced positions with equal distances left therebetween in the circumferential direction of the clutch, two cut-lines are formed on each of said levers at their outer peripheral side end, the outer peripheral side fulcrum and the intermediate fulcrum are formed by bending two outside pieces thus divided by said cutlines, a central piece formed between the said outside pieces is extended outwardly in a radial direction, said central piece fitting in an adjuster ring which screws into an inner peripheral face of the clutch cover, said adjuster ring for adjusting a wear of the clutch disc screwing in an inside face of outer peripheral part of the clutch cover in such a manner that its axial position can be freely adjusted, projections are formed at a plurality of places on an end face of the adjuster ring opposite to the flywheel side with equal spaces left therebetween in the circumferential direction, holes are made on the clutch cover corresponding to said projections on said end face of said adjuster ring, and a lock plate fitting in between said end face projections is disposed in the hole so that the lock plate can lock the adjuster ring in its circumferential direction while allowing its axial positional adjustment.

* * * * *